US012619024B2

(12) United States Patent
Xiong et al.

(10) Patent No.: US 12,619,024 B2
(45) Date of Patent: May 5, 2026

(54) PANEL LIGHT AND PANEL LIGHT APPARATUS

(71) Applicant: Shenzhen Qianyan Technology Ltd., Shenzhen (CN)

(72) Inventors: Zhiming Xiong, Shenzhen (CN); Yong Fang, Shenzhen (CN); Wenlong Wu, Shenzhen (CN)

(73) Assignee: Shenzhen Qianyan Technology Ltd., Shenzhen (CN)

( * ) Notice: Subject to any disclaimer, the term of this patent is extended or adjusted under 35 U.S.C. 154(b) by 0 days.

(21) Appl. No.: 19/220,405

(22) Filed: May 28, 2025

(65) Prior Publication Data

US 2025/0284047 A1 Sep. 11, 2025

Related U.S. Application Data

(63) Continuation of application No. PCT/CN2023/106813, filed on Jul. 11, 2023.

(30) Foreign Application Priority Data

Nov. 29, 2022 (CN) .......................... 202211517318.8
Nov. 29, 2022 (CN) .......................... 202223217222.8

(51) Int. Cl.
*F21V 8/00* (2006.01)

(52) U.S. Cl.
CPC ......... *G02B 6/0088* (2013.01); *G02B 6/0068* (2013.01); *G02B 6/0078* (2013.01)

(58) Field of Classification Search
CPC .. G02B 6/0078; G02B 6/0088; G02B 6/0068; G02B 6/0051; G02B 6/0055;
(Continued)

(56) References Cited

U.S. PATENT DOCUMENTS

2011/0221995 A1* 9/2011 Park .................... G02F 1/13336
349/58
2012/0243260 A1* 9/2012 Ohno ................... G02B 6/0078
362/613
2021/0199880 A1* 7/2021 Onitsuka ............. G07F 17/3223

FOREIGN PATENT DOCUMENTS

KR 20100121249 A * 11/2010 ........... G02B 6/0073

* cited by examiner

*Primary Examiner* — Erin Kryukova
(74) *Attorney, Agent, or Firm* — Wenye Tan

(57) ABSTRACT

The present disclosure discloses a panel light and a panel light apparatus. The panel light comprises a light guide plate module, a light-transmitting shell, and a light source module. The light guide plate module comprises at least two light guide plates spaced apart from each other, a light guide gap is formed between two adjacent light guide plates, and the light guide plates each comprise a light incident surface and a light exit surface. The light-transmitting shell is provided with an accommodating cavity, and the light guide plate module is arranged in the accommodating cavity. The light-transmitting shell comprises a light guide panel and at least one first light guide side edge. The light guide panel covers the light incident surface of the light guide plate module, and the first light guide side edge is arranged on a side of the light guide panel facing toward the accommodating cavity and is located in the light guide gap, which side faces toward the accommodating cavity. The light source module comprises a first light source and a second light source. The first light source is arranged opposite to the light incident surface of the light guide plate. The light emitted by the first light source enters the interior of the light guide plate through the light incident surface and exits through the light exit surface and the light guide panel. The light from the second light source exits through the first light guide side edge. The
(Continued)

above-mentioned panel light has relatively rich lighting effects.

20 Claims, 10 Drawing Sheets

(58) Field of Classification Search
CPC ......... G02B 6/0076; G02B 6/00; F21V 19/00; F21V 2200/20; F21V 7/0016; F21Y 2103/10; F21Y 2103/20; F21Y 2107/40; F21Y 2107/50; F21Y 2107/90; F21K 9/61; A63H 33/22; A63H 33/042; A63H 33/22042; F21S 2/005; F21S 8/032; F21S 8/033; A63F 2009/0672; A63F 2009/068; A63F 2009/0681; A63F 2009/0683; A63F 2009/0684; A63F 2009/0686; A63F 2009/0687; A63F 2009/0688; A63F 2009/069; A63F 2009/0691; A63F 2009/0694; A63F 2003/00646; A63F 2003/00652; E04B 5/046; E04F 2290/026
See application file for complete search history.

100

10

90

PANEL LIGHT AND PANEL LIGHT APPARATUS

CROSS-REFERENCE TO RELATED APPLICATIONS

The present application is a continuation application of PCT application No. PCT/CN2023/106813, filed on Jul. 11, 2023, which claims priority benefits of Chinese Patent Applications No. 202211517318.8, filed on Nov. 29, 2022, and No. 202223217222.8, filed on Nov. 29, 2022, the entire contents of all of which are hereby incorporated by reference for all purposes.

FIELD

The present application belongs to the technical field of lights, and more specifically, relates to a panel light and a panel light apparatus.

BACKGROUND

Panel lights have been widely used in people's daily life. When a panel light is on for illumination, the light is emitted along the lampshade of the panel light. Since the lampshade of the panel light is flat, the lighted panel light visually appears as a plane, fails to generate a sense of stereoscopic vision, and produces monotonous visual effects. With the gradual improvement of people's living standards, the panel lights that only have the lighting function can no longer meet the usage needs of consumers.

SUMMARY

The embodiments of the present disclosure provide a panel light and a panel light apparatus.

According to a first aspect of the present disclosure, an embodiment of the present disclosure provides a panel light, which comprises a light guide plate module, a light-transmitting shell, and a light source module. The light guide plate module comprises at least two light guide plates spaced apart from each other, a light guide gap is formed between two adjacent light guide plates, and the light guide plates each comprise a light incident surface and a light exit surface. The light-transmitting shell is provided with an accommodating cavity, and the light guide plate module is arranged in the accommodating cavity. The light-transmitting shell comprises a light guide panel and at least one first light guide side edge. The light guide panel covers the light incident surface of the light guide plate module, and the first light guide side edge is arranged on a side of the light guide panel facing toward the accommodating cavity and is located in the light guide gap. The light source module comprises a first light source and a second light source. The first light source is arranged opposite to the light incident surface of the light guide plate. The light emitted by the first light source enters the interior of the light guide plate through the light incident surface and exits through the light exit surface and the light guide panel. The light from the second light source exit through the first light guide side edge.

According to a second aspect of the present disclosure, an embodiment of the present disclosure provides a panel light apparatus, which comprises the above-mentioned panel light, wherein multiple panel lights are adapted to distribution on a predetermined plane, and outer peripheral walls of two adjacent panel lights are in contact with each other.

BRIEF DESCRIPTION OF THE DRAWINGS

To make clear the technical solutions in the embodiments of the present disclosure, a brief introduction will be given to the figures that need to be used in the description of the embodiments. It is apparent that the figures described below only relate to some embodiments of the present disclosure. Without creative efforts, persons skilled in the art can obtain other figures according to these drawings.

DETAILED DESCRIPTION

In order that persons skilled in the art have a better understanding of the technical solutions of the present disclosure, the technical solutions in the embodiments of the present disclosure will be described below in a clear and complete manner in combination with the drawings. It is apparent that the described embodiments are some of embodiments of the present disclosure, rather than all of them. All other embodiments that are obtained by persons skilled in the art without creative efforts on the basis of these embodiments in the present disclosure fall within the scope of protection of the present disclosure.

Figure 1:
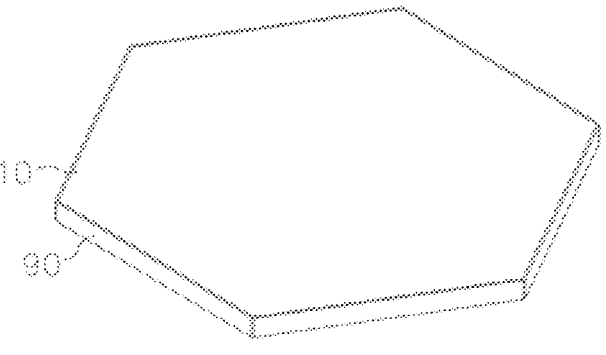
FIG. 1 is a structure diagram of a panel light provided in an embodiment of the present disclosure.
Figure 2:
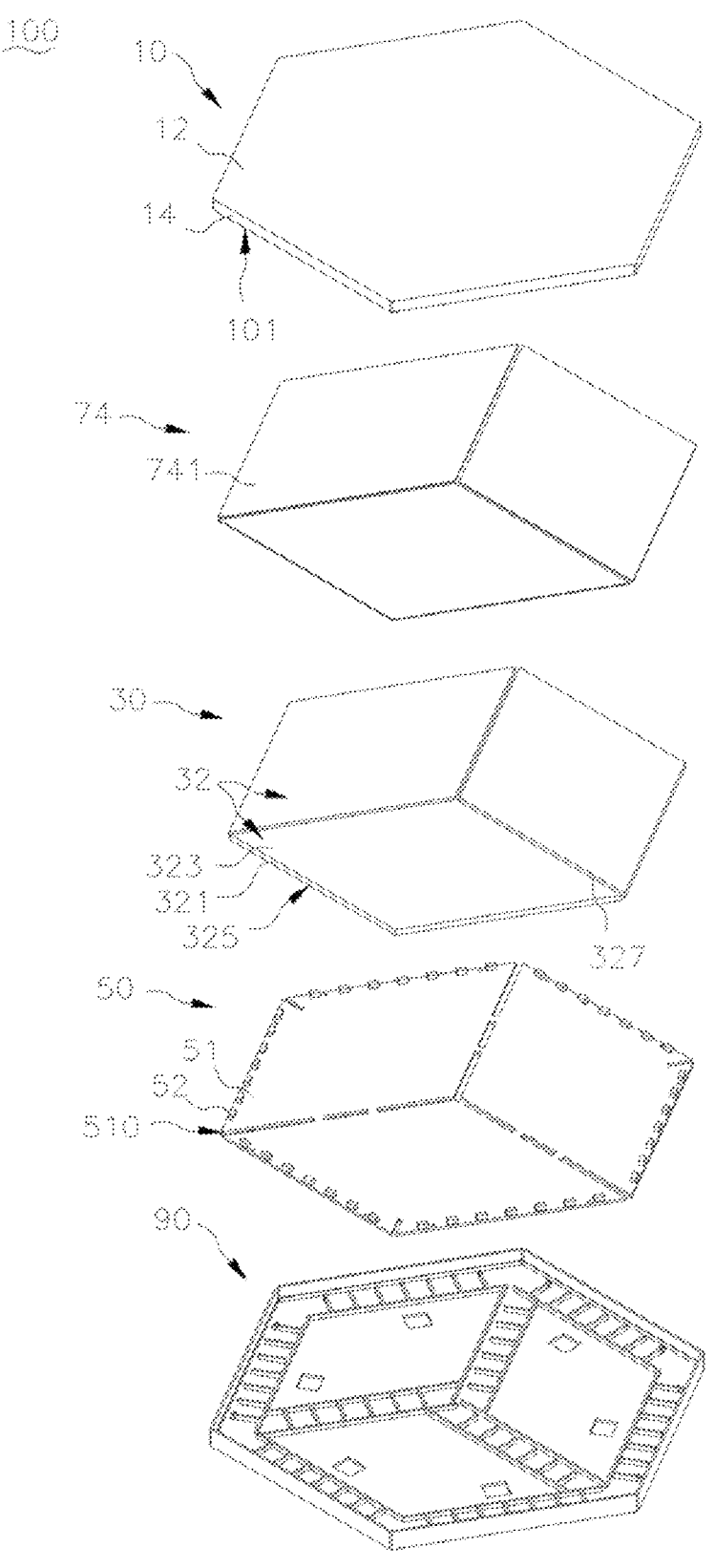
FIG. 2 is a three-dimensional breakdown diagram of the panel light in FIG. 1.

Referring to FIG. 1 and FIG. 2, a manner of implementation of the present disclosure provides a panel light 100, which can be used for illumination, decoration, etc. The panel light 100 comprises a light-transmitting shell 10, a light guide plate module 30, and a light source module 50. The light guide plate module 30 and the light source module 50 are both arranged in the light-transmitting shell 10. The light source module 50 is used to emit light, which is guided outward by the light guide plate module 30, penetrates through the light-transmitting shell 10, and transmit to the outside, so as to achieve the decorative and/or lighting effects.

Figure 3:
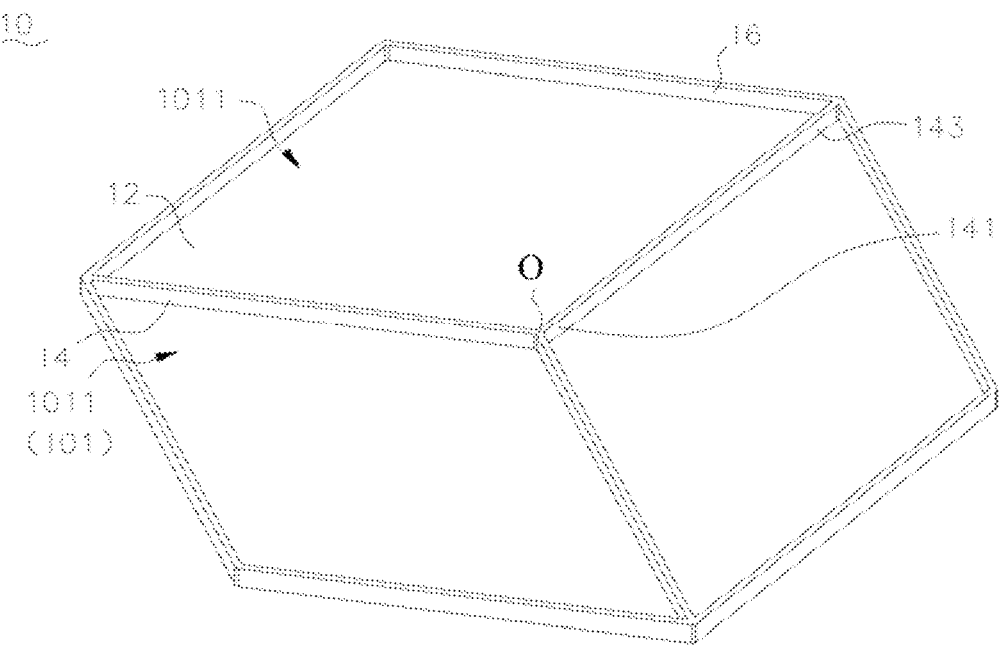
FIG. 3 is a structure diagram of a light-transmitting shell of the panel light in FIG. 2.

Referring to FIG. 3, in the present embodiment, the light-transmitting shell 10 can be roughly in the shape of a flat panel, and is used to define the overall outer contour shape of the panel light 100. The light-transmitting shell 10 is provided with an accommodating cavity 101, which is used to accommodate the light guide plate module 30 and the light source module 50. The light-transmitting shell 10 is made from light-transmitting materials, e.g., the light-transmitting materials of the light-transmitting shell 10 can include inorganic glass, organic high polymers, fiber nanocomposites, etc. As an example, the light-transmitting shell 10 can be made from at least one of such materials as glass fiber reinforced plastics, resin, and acrylic. Therefore, the light-transmitting shell 10 can be roughly transparent or semi-transparent to facilitate the transmission of light therein and the formation of a relatively clear light contour.

In the present embodiment, the light-transmitting shell 10 comprises a light guide panel 12 and at least one first light guide side edge 14.

The light guide panel 12 is used as the outer surface of the panel light 100, and is roughly in the shape of a flat panel. The light guide panel 12 is used to cover the light guide plate module 30 and allow the light inside the light guide plate module 30 to penetrate through the light guide panel 12, propagate to the outside, and produce a lighting effect of planar light emission. The specific contour of the light guide panel 12 can be a polygon, such as a triangle, a quadrangle, pentagon, and hexagon. It can also be an irregular figure, e.g., the outer contour of the light guide panel 12 is a figure, the contour of which is defined by straight segments and curved segments together. To be specific, in the illustrated embodiments, the outer contour of the light guide panel 12 is roughly a regular hexagon. It should be understood that the specific contour of the light guide panel 12 should not be confined to the examples listed in the present specification.

The first light guide side edge 14 is arranged on a side of the light guide panel 12 facing toward the accommodating cavity 101. The first light guide side edge 14 is used to allow penetration of the light from the light source module 50. When the light from the light source module 50 penetrates through the first light guide side edge 14 and transmits to the outside, it can produce a lighting effect of linear light emission. In the present embodiment, the first light guide side edge 14 is roughly in the shape of a long strip plate, and the dimension in the length direction thereof can be much larger than that in the width or thickness direction thereof. For example, the dimension in the length direction of the first light guide side edge 14 is greater than three times that in the width direction, so that it has a structure roughly in the shape of a long strip plate, and is thus used to guide light outward to produce the lighting effect of linear light emission. The first light guide side edge 14 is fixedly connected to the light guide panel 12 and protrudes relative to the surface of the light guide panel 12. Specifically, the first light guide side edge 14 can be roughly perpendicular to the light guide panel 12. Therefore, the first light guide side edge 14 is located in the accommodating cavity 101 and divides the accommodating cavity 101 into at least two accommodating chambers 1011, which are used to accommodate the light guide plates in the light guide plate module 30.

In the embodiments of the present disclosure, the number of the first light guide side edges 14 should not be limited by the present specification or the drawings, and the number thereof can be one or more. Specifically, the number of the first light guide side edges 14 can be N, wherein N is a positive integer greater than or equal to 1, e.g., N is 2 or greater than 2. By arranging N first light guide side edges 14, the accommodating cavity 101 can be divided into at least N accommodating chambers 1011 to arrange at least N corresponding light guide plates. N first light guide side edges 14 can also form N light-emitting lines, which is beneficial for enriching the lighting effect performance of the panel light 100. In the present embodiment, N first light guide side edges 14 are spaced apart from each other and distributed on the surface of the light guide panel 12. As an example, N first light guide side edges 14 can be distributed roughly radially with respect to a predetermined center point O; for example, each first light guide side edge 14 can comprise a first end 141 and a second end 143 that are opposite to each other; first ends 141 of N first light guide side edges 14 are connected to each other; the connection node of the first ends 141 of N first light guide side edges 14 is the predetermined center point O; the second end 143 of each first light guide side edge 14 extends in a direction away from the center point O; since the first light guide side edge 14 in the present embodiment is roughly in the shape of a flat panel, the above distribution ends up with radial distribution of N first light guide side edges 14 with respect to the center point O; the angle between every two adjacent first light guide side edges 14 is roughly the same, i.e., the distance between the second ends 143 of every two adjacent first light guide side edges 14 is roughly the same. To be specific, in the embodiment shown in FIG. 3, the number of the first light guide side edges 14 is three, and three first light guide side edges 14 are distributed linearly and radially with respect to the center point O. Of course, in other embodiments, the first light guide side edge 14 can also be in the shape of an arc-shaped strip. For example, when the first light guide side edge 14 is in the shape of an arc, N first light guide side edges 14 are distributed spirally and radially with respect to the center point O. For another example, when the first light guide side edge 14 is in the shape of a wave, N first light guide side edges 14 are distributed outward wavily and radially with respect to the center point O.

Among N first light guide side edges 14, there can exist a relationship of assembly connection, and there can also exist a relationship of integral connection. For example, the first ends 143 of N first light guide side edges 14 are all connected (i.e., at the center point O), or the first ends 143 of N first light guide side edges 14 can be roughly arranged around the center point O, but spaced apart from each other. Between N first light guide side edges 14 and the light guide panel 12, there can exist a relationship of assembly connection, and there can also exist a relationship of integral connection. For example, after the light guide panel 12 and the first light guide side edges 14 are separately prepared and molded, they are connected by an adhesive or fasteners; alternatively, the light guide panel 12 and the first light guide side edge 14 can be prepared by using the same material through the injection molding process or the compression molding process, so as to form the light-transmitting shell 10 in an integral structure.

In the present embodiment, the light-transmitting shell 10 can further comprise a second light guide side edge 16. The second light guide side edge 16 is arranged on a side of the light guide panel 12 facing toward the accommodating cavity 101. The second light guide side edge 16 is used to allow penetration of the light from the light source module 50. When the light from the light source module 50 penetrates through the second light guide side edge 16 and transmits to the outside, it can produce the lighting effect of linear light emission. In the present embodiment, the second light guide side edge 16 is roughly in the shape of a long strip plate, and the dimension in the length direction thereof can be much larger than that in the width or thickness direction. For example, the dimension in the length direction of the second light guide side edge 16 is greater than three times that in the width direction, so that it has a structure roughly in the shape of a long strip plate, and is thus used to guide light outward to produce the lighting effect of linear light emission. The second light guide side edge 16 is fixedly connected to the light guide panel 12, and protrudes relative to the surface of the light guide panel 12. Specifically, the second light guide side edge 16 can be roughly perpendicular to the light guide panel 12.

In the embodiments of the present disclosure, the number of the second light guide side edges 16 should not be limited by the present specification or the drawings, and the number thereof can be one or more. When there are multiple second light guide side edges 16, the multiple second light guide side edges 16 are sequentially connected end to end to jointly define the accommodating cavity 101. Specifically, the number of second light guide side edge 16 can be M, wherein M is a positive integer greater than or equal to 2, e.g., M is 2 or greater, and M is an integer multiple of N. (M/N) second light guide side edges 16 are sequentially connected between two adjacent first light guide side edges 14, so that (M/N) second light guide side edges 16 and two first light guide side edges jointly surround and define a corresponding accommodating chamber 1011, which is used to accommodate a corresponding light guide plate in the light guide plate module 30. M second light guide side edges 16 can also form M light-emitting lines. On a light-emitting plane that is formed by combining the light-emitting lines formed by M second light guide side edges 16 and N first light guide side edges 14 with the corresponding light guide plate, various lighting effects can be customized, such as three-dimensional geometric lighting effects, which is conducive to enriching the lighting effect performance of the panel light 100.

In the embodiment shown in FIG. 3, the number of the second light guide side edges 16 is six and the number of the first light guide side edges 14 is three. Two second light guide sides 16 are sequentially connected between every two adjacent first light guide sides 14, so that two second light guide sides 16 and two first light guide sides 14 jointly surround and define a corresponding accommodating chamber 1011. When multiple light guide plates in the light guide plate module 30 are respectively arranged in the corresponding accommodating chambers 1011, it is beneficial to producing a three-dimensional geometric light effect of a hexahedron. In the present embodiment, between M second light guide side edges 16 and the light guide panel 12, there can exist a relationship of assembly connection, and there can also exist a relationship of integral connection. For example, after the light guide panel 12 and the second light guide side edges 16 are separately prepared and molded, they are connected by an adhesive or fasteners; alternatively, the light guide panel 12 and the second light guide side edges 16 can be prepared by using the same material through the injection molding process or the compression molding process.

Figure 4:
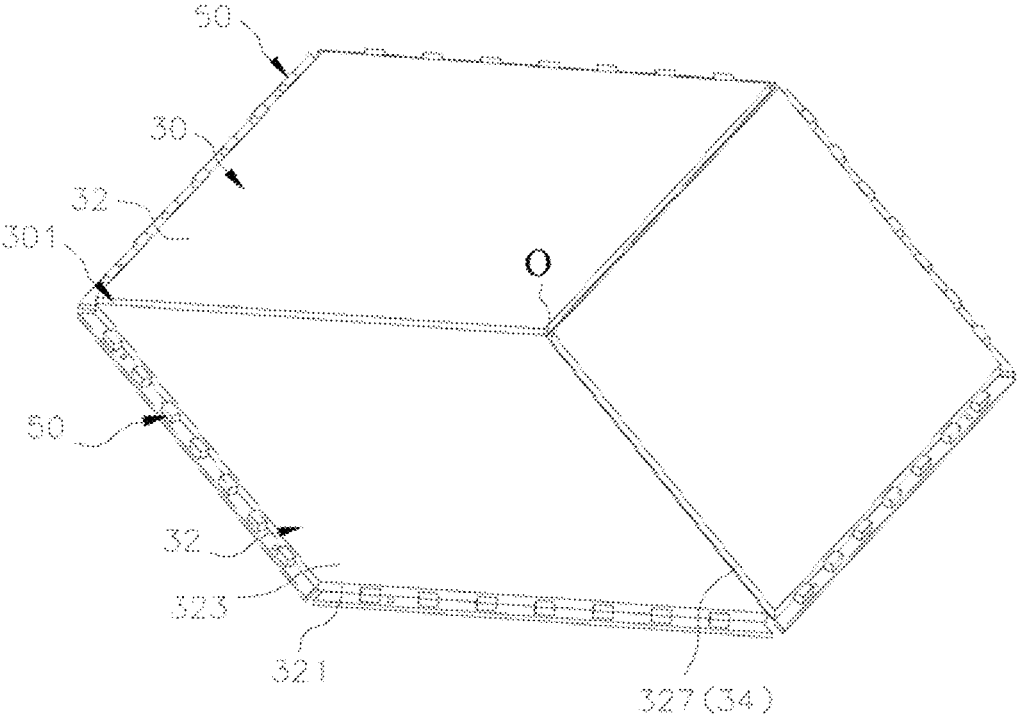
FIG. 4 is an assembly diagram of a light guide plate module and a light source module of the panel light in FIG. 2.
Figure 5:
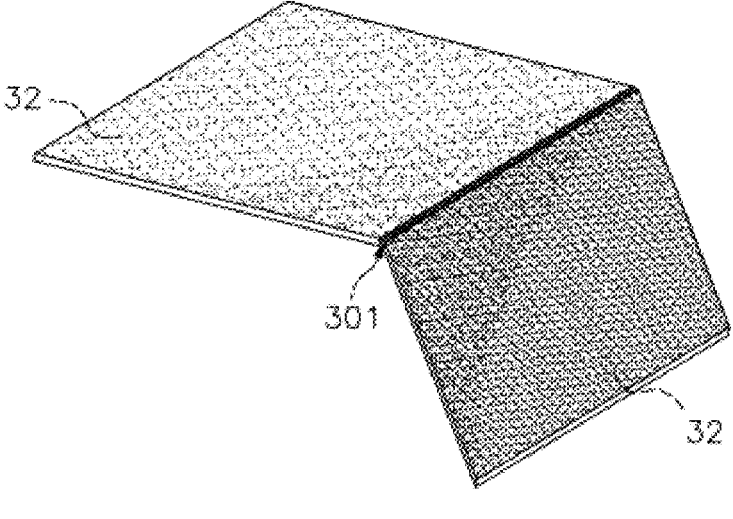
FIG. 5 is a lighting effect diagram of the panel light in the embodiment of the present disclosure.

Referring to FIG. 4, the light guide plate module 30 is arranged in the accommodating cavity 101 of the light-transmitting shell 10, and used to guide the light from the light source module 50 toward the light-transmitting shell 10, so as to produce a lighting effect of a light-emitting surface after the light penetrates through the light-transmitting shell 10 and exits. The light guide plate module 30 comprises at least two light guide plates 32 spaced apart from each other, and said at least two light guide plates 32 are distributed on the same plane to produce the lighting effect of planar light emission. When two light guide plates 32 are distributed in the accommodating cavity 101, the light guide panel 12 covers the light guide plate module 30 and the light exit surfaces of the light guide plates 32. A light guide gap 301 is formed between two adjacent light guide plates 32, and used to accommodate the first light guide side edge 14. When the first light guide side edge 14 is arranged in the light guide gap 301, some of the light from the light source module 50 can sequentially exit through the light guide plates 32 and the light guide panel 12 to form a light-emitting surface, while the rest of the light from the light source module 50 can also exit through the first light guide side edge 14 to form a light-emitting line, so that the lighting effect of combining the light-emitting surface with the light-emitting line can be achieved. When the light corresponding to said at least two light guide plates 32 is different in brightness, since the light-emitting line formed by the first light guide side edge 14 is between two light guide plates 32, the light-emitting line can be highlighted between at least two light-emitting surfaces, the combination of said at least two light-emitting surfaces and the light-emitting line can produce a relatively layered three-dimensional lighting effect (see the example as shown in FIG. 5), and the lighting effect performance of the panel light 100 can be enriched.

Figure 6:
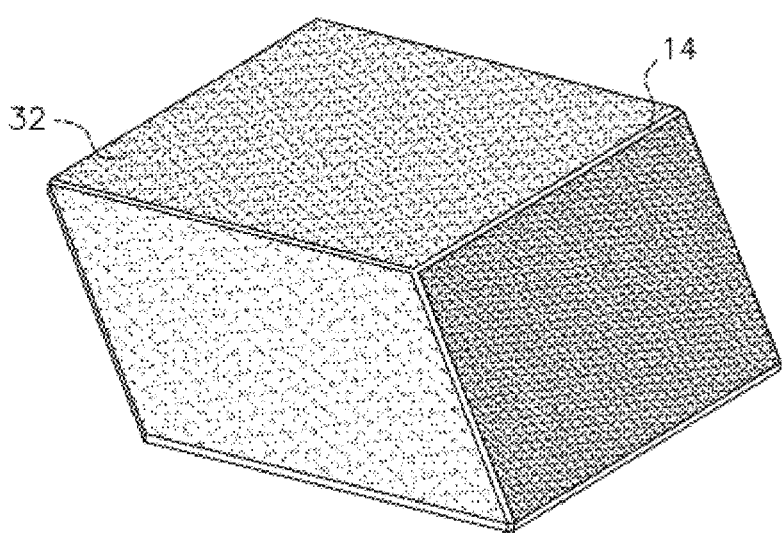
FIG. 6 is another lighting effect diagram of the panel light in the embodiment of the present disclosure.

Referring to FIG. 4 again, in the present embodiment, the number of the light guide plates 32 is N, wherein N is a positive integer greater than or equal to 1, e.g., N is 2 or greater than 2. The number of the light guide plates 32 can be roughly the same as that of the first light guide side edges 14. Therefore, N light guide plates 32 are arranged, in one-to-one correspondence, in N accommodating chambers 1011 formed by N first light guide side edges 14, so that N light guide plates 32 are sequentially distributed around the predetermined center point O, and each first light guide side edge 14 is located between two corresponding adjacent light guide plates 32. In the present embodiment, it is arranged that there are three light guide plates 32 and three first light guide side edges 14; the light guide plates 32 are all in a diamond-shaped structure; the three light guide plates 32 are sequentially distributed around the predetermined center point O, and can jointly form a light-emitting surface in the shape of a regular hexagon; when the light from the light source module 50 exit through the three light guide plates 32 and the three first light guide side edges 14, the combination of the light-emitting surface and the light-emitting lines can produce a visually three-dimensional lighting effect as shown in FIG. 6. In the lighting effect, a three-dimensional hexahedral figure can be observed with human eyes (different gray levels are used in the figure to reflect the difference in color or brightness between different light-emitting surfaces).

Referring to FIG. 4 again, the light guide plate 32 comprises a light incident surface 321 and a light exit surface 323. The light exit surface 323 and the light guide panel 12 are arranged opposite to each other. The light incident surface 321 is used to allow incidence of the light from the light source module 50, and the incident light exits through the light exit surface 323. In the present embodiment, the light incident surface 321, as a peripheral wall of the light guide plate 32, is roughly arranged in the thickness direction of the light guide plate 32 and adjacent to the light exit surface 323.

Further, the light guide plate 32 can further comprise a back surface 325 (FIG. 2) that faces away from the light exit surface 323. The back surface 325 is located on a side of the light guide plate 32 away from the light guide panel 12, and the light incident surface 321 is connected between the back surface 325 and the light exit surface 323. The back surface 325 is provided with a textured reflection mesh structure, which is used to diffuse the light in the light guide plate 32. Through the textured reflection mesh structure, the conditions for mirror reflection can be broken. When the light from the light source module 50 enters the interior of the light guide plate 32 through the light incident surface 321 and propagates in the light guide plate 32, under the action of the textured reflection mesh structure, the light can diffuse in all directions, and then uniformly exits through the light exit surface 321, thereby forming a light-emitting surface with relatively uniform brightness.

Figure 7:
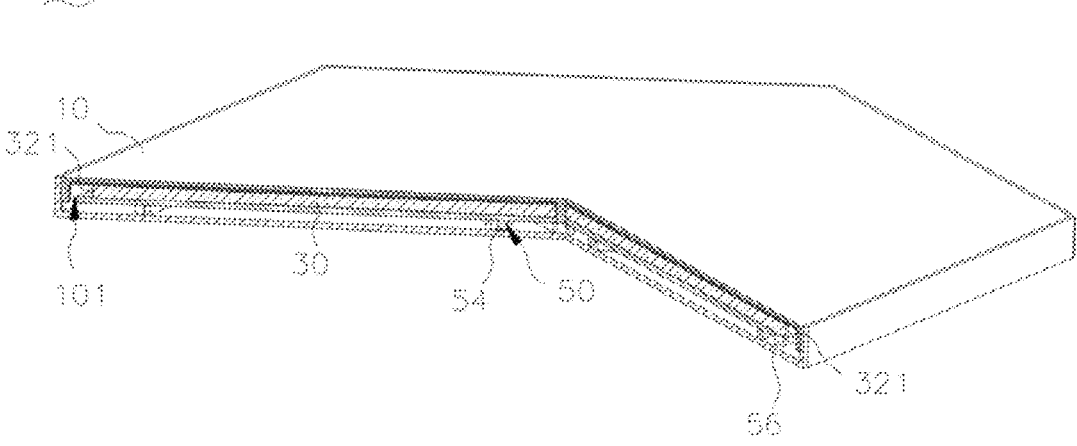
FIG. 7 is a three-dimensional cutaway diagram of the panel light in FIG. 1.
Figure 8:
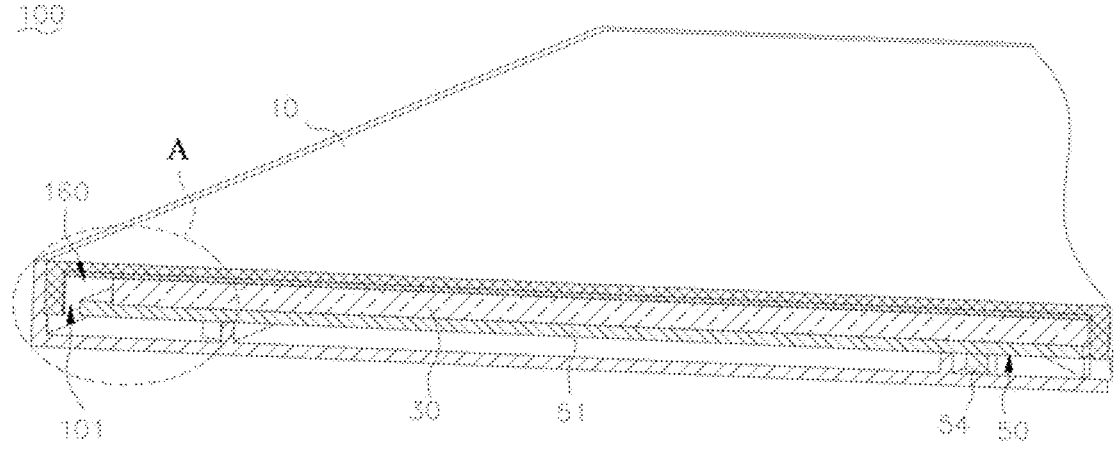
FIG. 8 is a partial enlarged diagram of the panel light in FIG. 7.
Figure 9:
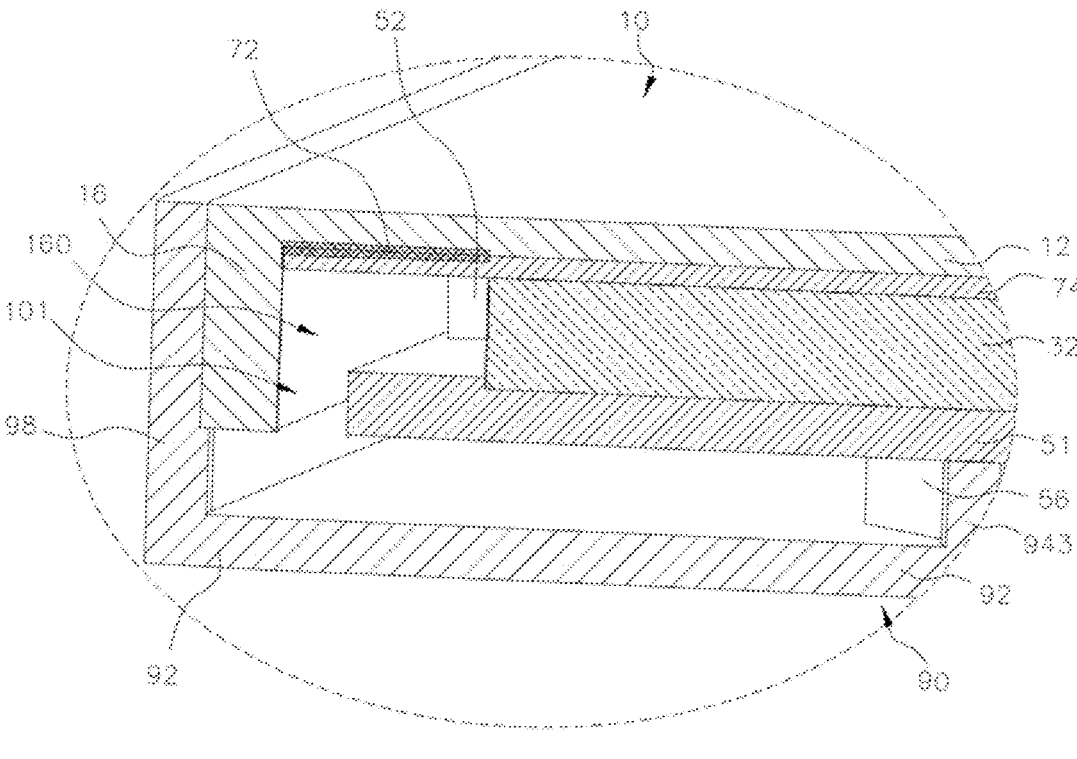
FIG. 9 is an enlarged diagram of Area A of the panel light in FIG. 8.

Referring to FIGS. 7 to 9 at the same time, in the present embodiment, the light incident surface 321 is arranged on a side of the light guide plate 32 away from the light guide gap 301, to avoid the light incident surface 321 from being located between multiple light guide plates 32, in favor of the layout of light-emitting units of the light source module 50. Relatively speaking, the light incident surface 321 is located on a relatively outer side of the light guide plate 32, i.e., the light incident surface 321 of one light guide plate 32 is located on a side of the light guide plate 32 which side is not adjacent to other light guide plates 32, so that the light incident surface 321 is arranged opposite to and apart from the inner wall of the second light guide side edge 16 of the light-transmitting shell 10. A predetermined gap 160 is formed between the light incident surface 321 and the corresponding second light guide side edge 16. The predetermined gap 160 is used to accommodate a part of the light source module 50, so as to make the structure of the panel light 100 more compact.

Further, the light guide plate 32 further comprises multiple side surfaces 327 (FIG. 4). The side surfaces 327 each are connected between the back surface 325 and the light exit surface 323. The light incident surface 321 and multiple side surfaces 327 together form an outer side wall of the light guide plate 32. The side surfaces 327 are located on a side of the light guide plate 32 facing toward the light guide gap 301, and the side surface 327 of one light guide plate 32 is arranged apart from the side surface 327 of another light guide plate 32 adjacent thereto. The number of the light incident surfaces 321 included in one light guide plate 32 can be multiple, such as two or more. Multiple light incident surfaces 321 and multiple side surfaces 327 jointly define the outer contour of the light guide plate 32 as a polygonal geometric shape, which is conducive to producing a three-dimensional lighting effect. In the present embodiment, the light guide plate 32 is roughly in the shape of a diamond, and one light guide plate 32 comprises two light incident surfaces 321 and two side surfaces 327, and the length dimension of the light incident surfaces 321 is roughly the same as that of the side surfaces 327.

Further, the light guide plate module 30 can further comprise a reflective layer 34, which is arranged on at least one of the back surface 325 and the side surface 327. The reflective surface of the reflective layer 34 is arranged to face toward the interior of the light guide plate 32, so as to reflect the light propagated to the back surface 325 or/and the side surface 327 back into the interior of the light guide plate 32. The reflective layer 34 can be a reflective paper, which can be attached to the back surface 325 or/and side surface 327. Alternatively, the reflective layer 34 can be a reflective coating, which is applied to the back surface 325 and/or the side surface 327. By arranging the reflective layer 34, light can be prevented from leaking out of the side surfaces of the light guide plate 32, except the light exit surface 323. For example, when the reflective layer 34 is arranged on the side surface 327, it can prevent light from leaking through the side surface 327 into the light guide gap 301, thereby effectively avoiding light mixing in the gap and making the contour of the light-emitting surface formed by the light guide plate 32 relatively clear; by arranging the reflective layer 34, the light loss can also be reduced when light propagates in the light guide plate 32, which results in a relatively high light utilization rate.

Figure 10:
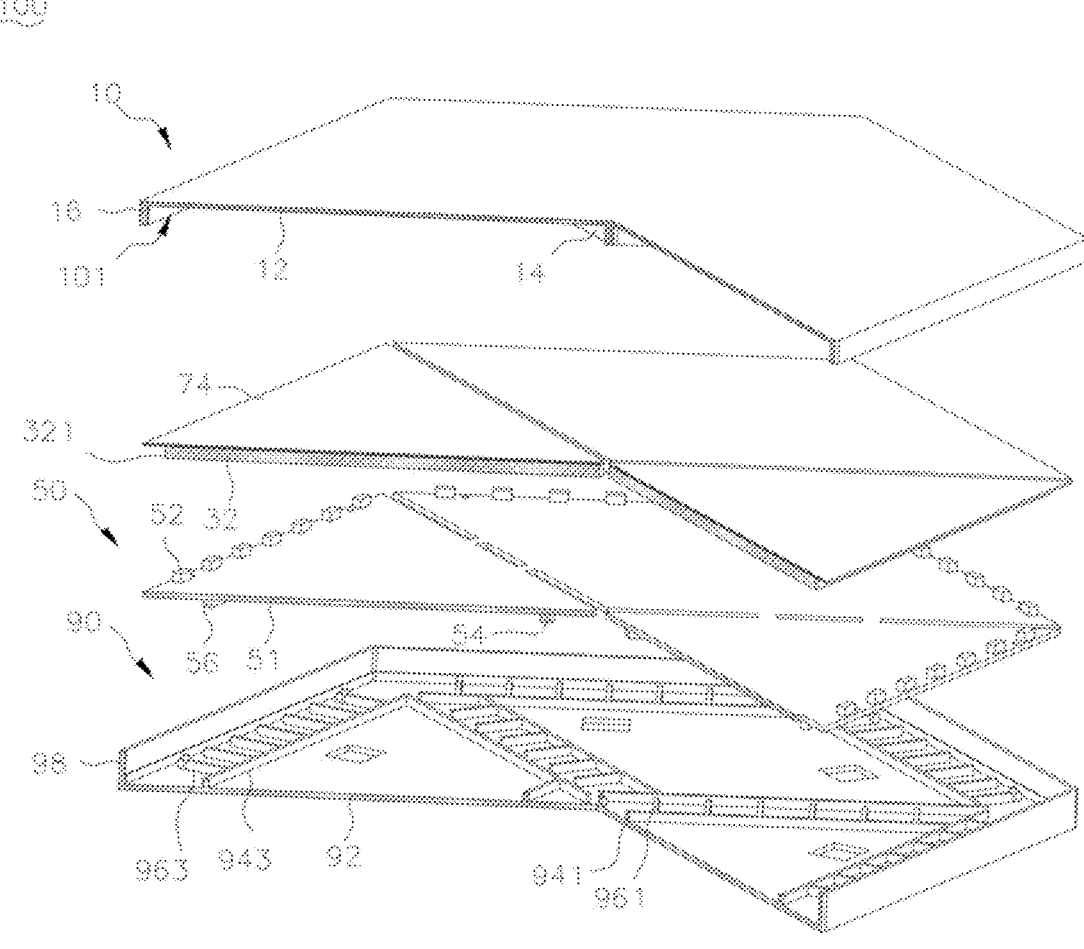
FIG. 10 is a three-dimensional breakdown diagram of the panel light in FIG. 7.

The light source module 50 is arranged on a side of the light guide plate module 30 away from the light guide panel 12. In the present embodiment, referring to FIGS. 10 and 11, the light source module 50 comprises a first light source 52 and a second light source 54. The first light source 52 is arranged opposite to the light incident surface 321 of the light guide plate 32. The light emitted by the first light source 52 enters the interior of the light guide plate 32 through the light incident surface 321 and exits through the light exit surface 323 and the light guide panel 12. The light from the second light source 54 exit through the first light guide side edge 14. As the first light source 52 and the second light source 54 respectively provide incident light for the light guide plate 32 and the first light guide side edge 14, a coordinated lighting effect of planar light emission and linear light emission can be achieved. Moreover, the light from the first light source 52 and the second light source 54 can be independently controlled, which is conducive to achieving multiple lighting effects. Further, since the second light source 54 provides incident light solely for the first light guide side edge 14, the brightness of the first light guide side edge 14 can be customized according to needs. When the color or brightness thereof is different from that of the first light source 12, the display of the light-emitting lines on the first light guide side edge 14 is more prominent than the light-emitting surface on the light guide panel 12. By combining the light-emitting lines with the light-emitting surfaces that correspond to at least two light guide plates 32, a three-dimensional lighting effect can be produced, which enriches the lighting effect performance of the panel light 100.

Figure 11:
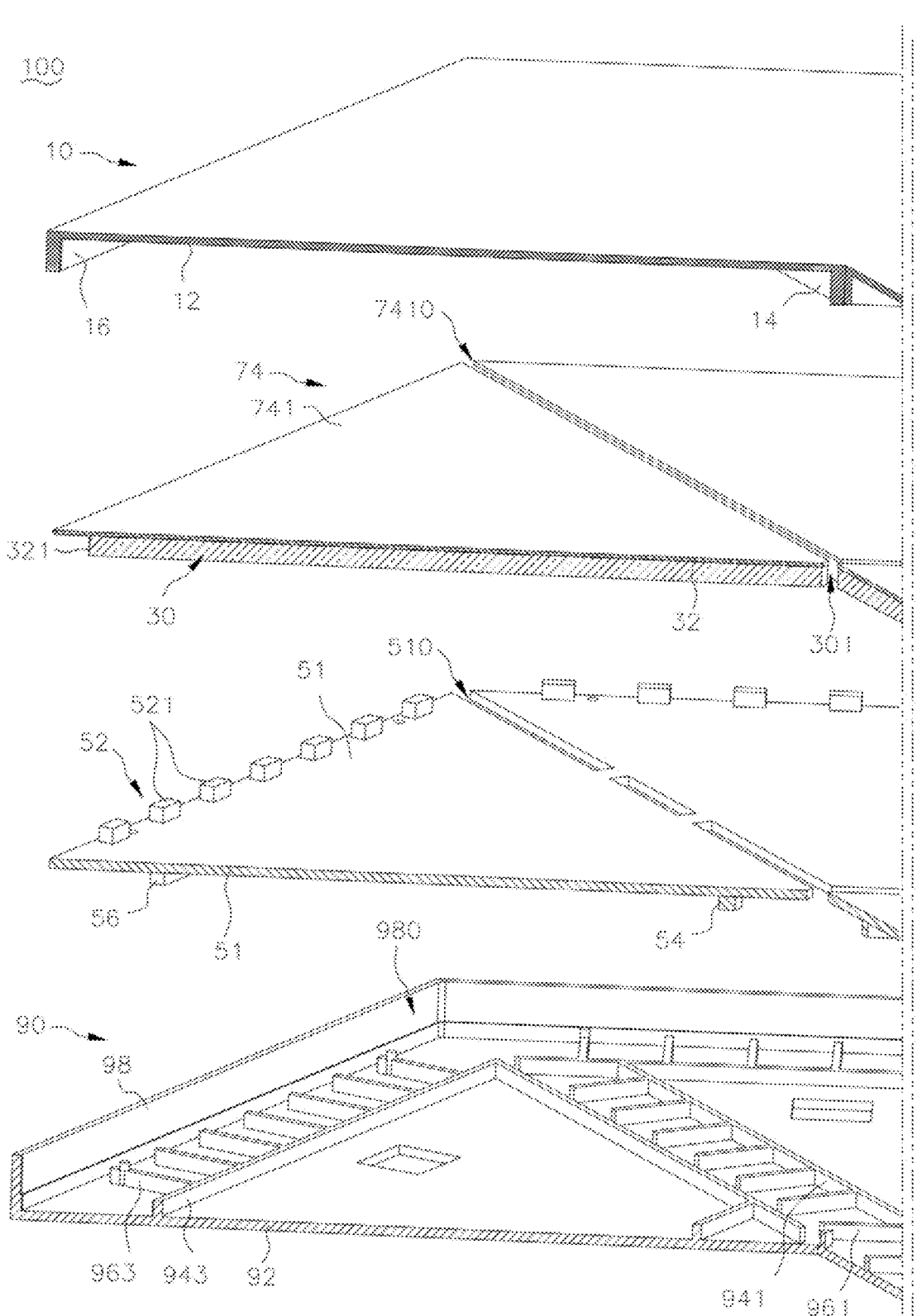
FIG. 11 is a partial enlarged diagram of the panel light in FIG. 10.

In the embodiment shown in FIG. 11, the light source module 50 can further comprise a substrate 51. The substrate 51 is arranged on a side of the light guide plate module 30 away from the light guide panel 12. The first light source 52 and the second light source 54 are both arranged on the substrate 51. The substrate 51 can be a printed circuit board, on which conductive traces can be provided for electrical connection with the first light source 52 and the second light source 54. The first light source 52 is arranged a side of the substrate 51 facing toward the light guide plate 32, and is roughly located at the edge of the substrate 51. Since the light incident surface 321 of the light guide plate 32 is located between the light exit surface 325 and the substrate 51, the first light source 52 can be arranged to face toward the light incident surface 321, and the first light source 52 and the light guide plate 32 are roughly arranged in the same plane, which can effectively reduce the dimension of the panel light 100 in the thickness direction. In the present embodiment, there are multiple first light sources 52, and the multiple first light sources 52 are arranged in one-to-one correspondence with multiple light incident surfaces 321.

The light from each first light source 52 is incident on the light guide plate 32 through the corresponding light incident surfaces 321.

The first light source 52 comprises multiple first light-emitting units 521 which are spaced apart from each other and distributed in the extension direction of the corresponding light incident surface 321. The first light-emitting unit 521 can be a LED light-emitting unit, which has a light exit side that is arranged to face toward the light incident surface 321. Since the light incident surface 321 and the inner wall of the second light guide side edge 16 of the light-transmitting shell 10 are arranged opposite to and apart from each other and a predetermined gap 160 is formed between the light incident surface 321 and the corresponding second light guide side edge 16, multiple first light-emitting units 521 are arranged in the predetermined gap 160, and the first light-emitting units 521 face away from the second light guide side edge 16, so that as much light from the first light source 52 can be incident on the light guide plate 12 as possible.

Figure 12:
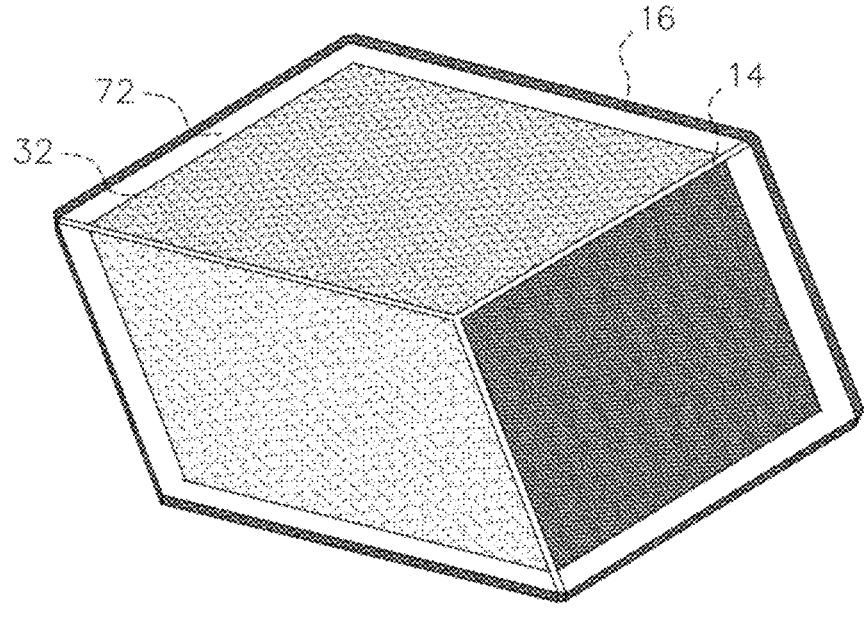
FIG. 12 is another lighting effect diagram of the panel light in the embodiment of the present disclosure.

Further, referring to FIG. 9 again, to prevent the light from the first light source 52 from leaking out of the predetermined gap 160, the panel light 100 can further comprise a light shielding layer 72. The light shielding layer 72 can be located on the side of the first light source 52 away from the substrate 51. Specifically, when the first light source 52 is arranged in the predetermined gap 160, the light guide panel 12 covers the predetermined gap 160. When the light from the first light source 52 is incident on the light incident surface 321 along the plane where the substrate 51 is, a small portion of the light may be reflected by other parts to propagate in a direction away from the substrate 51. At this time, by arranging the light shielding layer 72 on a side of the first light source 52 away from the substrate 51, e.g., arranging the light shielding layer 72 between the first light source 52 and the light guide panel 12, this portion of the light can be blocked from emergence, which can leave a gap between the light-emitting surface formed by the light guide plate 32 and the light emitting-line formed by the second light guide side edge 16 and form a light-dark contrast while ensuring the light utilization efficiency to a certain extent. When the panel light 100 is in the full-brightness state, the generated three-dimensional sense of the figure is more prominent, as shown in FIG. 12.

Further, in the present embodiment, the light transmittance of the light shielding layer 72 is lower than that of the light guide plate 32, and also lower than that of the light guide panel 12, so as to block the light, and thus produce a lighting effect of displaying a light-dark contrast. The light shielding layer 72 can be made from non-transparent materials, such as light shielding materials, and the specific form thereof can be: a light shielding coating, a light shielding tape, a light shielding cloth, a light shielding plate, etc. The light shielding layer 72 can be attached to the inner surface of the light guide panel 12 and correspondingly cover the predetermined gap 160. Alternatively, the light shielding layer 72 can also be attached to the outer surface of the light guide panel 12. Alternatively, the light shielding layer 72 per se is a plate made from light shielding materials, and is fixed in the light-transmitting shell 10.

Referring to FIG. 11 again, in the present embodiment, the panel light 100 can further comprise a diffusion plate module 74, which is arranged between the light guide panel 12 of the light-transmitting shell 10 and the light guide plate module 30. The diffusion plate module 74 is used to diffuse the light exits through the light guide plate module 30, so as to make the light of the light-emitting surface more uniform. The diffusion plate module 74 can also be used to mount the light shielding layer 72, e.g., the diffusion plate module 74 can cover the predetermined gap 160, and the light shielding layer 72 can be arranged on a side of the diffusion plate module 74 away from the predetermined gap 160 or toward the predetermined gap 160.

As an example, the diffusion plate module 74 can comprise at least two diffusion plates 741 that are arranged apart from each other, and said at least two diffusion plates 741 are distributed on the same plane. The diffusion plate 741 can be a scattered light diffusion plate, in which chemical particles as scattering particles can be arranged to continuously refract, reflect, and scatter light in two media with different refractive indices when the light penetrates through the scattering layer, thereby producing an optical diffusion effect. Alternatively, the diffuser plate 741 can be a microstructured light diffusion plate, on the surface of which microstructural features are arranged in an array to refract light in different directions, change the travel path of the light, realize full scattering of the light, and achieve a softer and more uniform illumination effect when the light penetrates therethrough. Wherein, the microstructural array can include at least one of the following structures: V-shaped groove array, U-shaped protrusion array, pyramid array, circular ring array, microlens array, etc. The number of the diffusion plates 74 is the same as that of the light guide plates 32, and at least two diffusion plates 74 are stacked on at least two light guide plates 32 in one-to-one correspondence therewith to make the light exit from the corresponding light guide plates 32 more uniform. Further, a through groove 7410 is formed between two adjacent diffusion plates 741, and is opposite to and in communication with the corresponding light guide gap 301. The through groove 7410 is used to partially accommodate the corresponding first light guide side edge 14. The first light guide side edge 14 is threaded through the corresponding through groove 7410 and the corresponding light guide gap 301, so as to be exposed on a side of the light guide plate 32 away from the light guide panel 12, and thus guide the light from the second light source 54 outward.

The second light source 54 is fixed on a side of the substrate 51 facing away from the light guide plate module 30. In the present embodiment, the substrate 51 is provided with a clearance groove 510, which is opposite to and in communication with the corresponding light guide gap 301. The second light source 54 is arranged adjacent to the clearance groove 510. The first light guide side edge 14 is threaded through the through groove 7401, the light guide gap 301, and the clearance groove 510 one after another, and exposed on a side of the substrate 51 facing away from the light guide plate module 30, so that the light from the second light source 54 can be incident on and penetrate through the first light guide side edge 14 to exit. The number of the second light source 54 can be the same as that of the first light guide side edge 14. For example, there are multiple second light sources 54, and multiple second light sources 54 are arranged in one-to-one correspondence with multiple first light guide side edges 14. The light from each second light source 54 exits into the external environment through the corresponding first light guide side edge 14 to produce a lighting effect of a light-emitting line.

Figure 13:
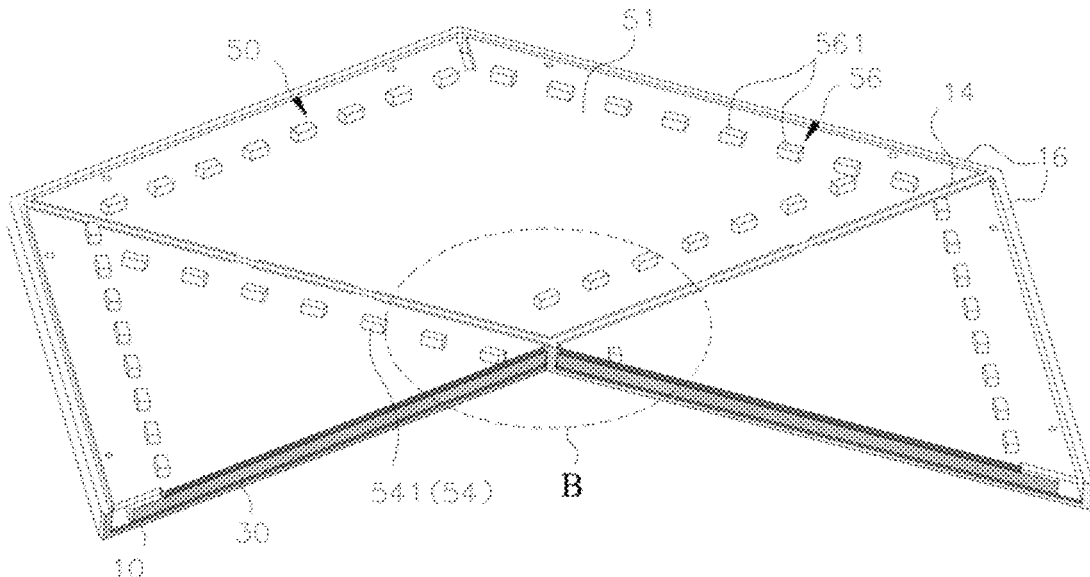
FIG. 13 is a diagram of the panel light in FIG. 7 from another perspective, with a bottom shell omitted.
Figures 14, 15:
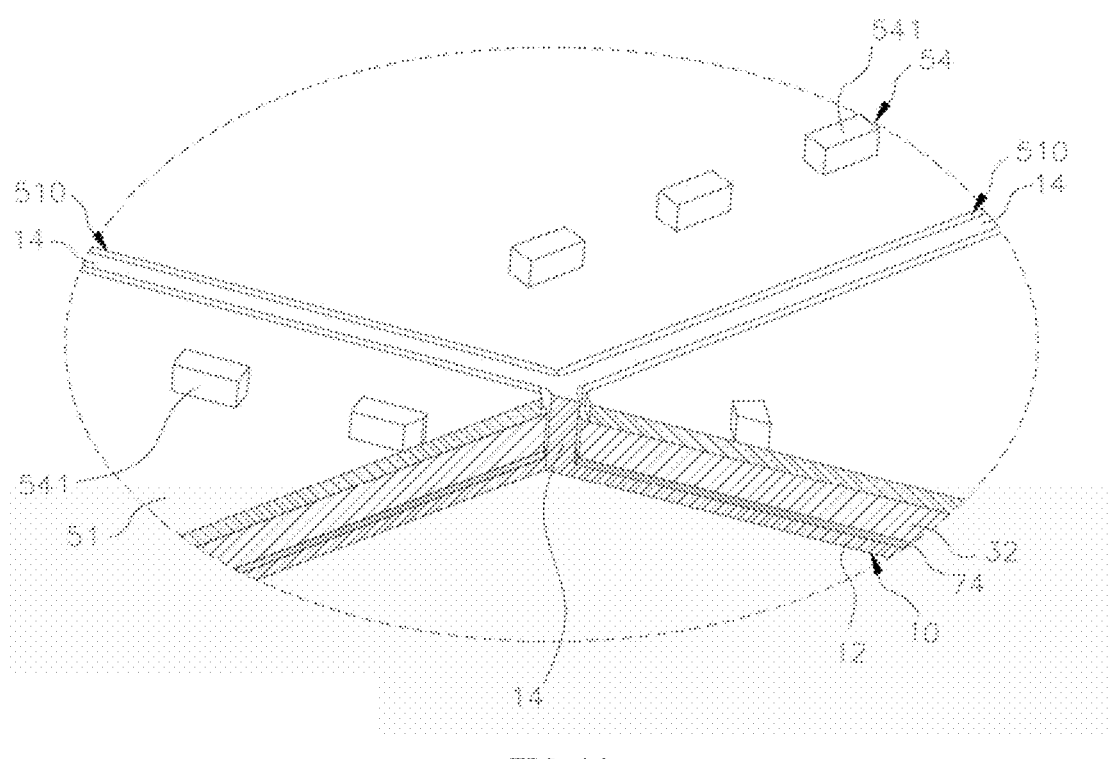
FIG. 14 is an enlarged diagram of Area B of the panel light in FIG. 13.
FIG. 15 is a diagram of the panel light in FIG. 13, with a bottom shell assembled virtually.

Referring to FIGS. 13 and 14, in the present embodiment, to improve the light utilization efficiency of the second light source 54, the first light guide side edge 14 can be exposed on a side of the substrate 51 away from the light guide plate 32. For example, an end face of the first light guide side edge 14 is flush with a side surface of the substrate 51 away from the light guide plate 32, so that the light from the second light source 54 located on this side of the substrate 51 can be directly incident on the first light guide side edge 14.

In other embodiments, the first light guide side edge 14 can protrude relative to a side of the substrate 51 away from the light guide plate module 30, so that a portion of the first light guide side edge 14 can be arranged apart from the second light source 54. As a result, the light from the corresponding second light source 54 can be directly incident on the first light guide side edge 14, the efficiency of guiding the light outwards is relatively high, and the brightness of the light-emitting line that corresponds to the first light guide side edge 14 is relatively high. Further, in such embodiments, a reflective element (not shown in the figure) can be provided on a side of the first light guide side edge 14 away from the second light source 54; the reflective element has a reflective surface that faces toward the interior of the first light guide side edge 14, to avoid mixing the light from the second light source 54 with the other light and improve the utilization efficiency of the light from the second light source 54.

The second light source 54 comprises multiple second light-emitting units 541 which are spaced apart from each other and distributed in the extension direction of the corresponding first light guide side edge 14. The second light-emitting unit 541 can be a LED light-emitting unit, which has a light exit side that is arranged to face toward the first light guide side 14.

In the present embodiment, the light source module 50 can further comprise a third light source 56, which is used to provide incident light for the second light guide side edge 16. In other words, the light from the third light source 56 exits through the second light guide side edge 16 to produce a lighting effect of a light-emitting line. Since the second light guide side edge 16 and the corresponding first light guide side edge 14 are arranged to jointly surround one light guide plate 32, the light-emitting line that corresponds to the second light guide side edge 16 and the corresponding first light guide side edge 14 surrounds the light-emitting surface that corresponds to the light guide plate 32, so as to produce a three-dimensional visual lighting effect with relatively clearly defined edges and angles.

The third light source 56 is arranged on a side of the substrate 51 away from the light guide plate 32. The third light source 56 is roughly located at the edge of the substrate 51. Corresponding to the third light source 56, an end portion of the second light guide side edge 16 is exposed on a side of the substrate 51 away from the light guide plate module 30, so that the light from the third light source 56 can be incident on and penetrate through the second light guide side edge 16 to exit. The number of the third light source 56 can be the same as that of the second light guide side edge 16. For example, there are multiple third light sources 56, and the multiple third light sources 56 are arranged in one-to-one correspondence with multiple second light guide side edges 16. The light from each third light source 56 exits into the external environment through the corresponding second light guide side edge 16, so as to form a light-emitting line.

In the present embodiment, to improve the light utilization efficiency of the third light source 56, the second light guide side edge 16 can be exposed on a side of the substrate 51 away from the light guide plate 32. For example, an end face of the second light guide side edge 16 is flush with a side surface of the substrate 51 away from the light guide plate 32, so that the light from the third light source 56 located on this side can be directly incident on the second light guide side edge 16.

In other embodiments, the second light guide side edge 16 can protrude from a side of the substrate 51 away from the light guide plate module 30, so that a portion of the second light guide side edge 16 can be arranged opposite to and apart from the third light source 56, and the light from the corresponding third light source 56 can be directly incident on the second light guide side edge 16. Further, in such embodiments, a reflective element (not shown in the figure) can be provided on a side of the second light guide side edge 16 away from the third light source 56, and the reflective element has a reflective surface that faces toward the interior of the second light guide side edge 16, so as to avoid mixing the light from the third light source 56 with the other light and improve the utilization efficiency of the light from the third light source 56.

The third light source 56 comprises multiple third light-emitting units 561 which are spaced apart from each other and distributed in the extension direction of the corresponding second light guide side 16. The third light-emitting unit 561 can be an LED light-emitting unit, which has a light exit side that faces toward the second light guide side 16. Further, the third light-emitting units 561 of the third light source 56 are distributed at the edge of the substrate 51, and the distance between the third light source 56 and the outer periphery of the substrate 51 is greater than that between the first light source 52 and the outer periphery of the substrate 51, i.e., the third light source 56 is relatively closer to the center of the substrate 51. Therefore, the staggered arrangement of the first light source 52 and the third light source 56 in the thickness direction can prevent optical crosstalk and facilitate laying out conductive traces on the substrate 51.

Referring to FIG. 11 and FIG. 15 at the same time, in the present embodiment, the panel light 100 can further comprise a bottom shell 90, which is used to interlock with the light-transmitting shell 10 to accommodate the light guide plate module 30 and the light source module 50, so as to produce a protective effect. The bottom shell 90 comprises a bottom wall 92 and a first light blocking strip 941.

The bottom wall 92 is roughly in the shape of a plate, and is fixedly arranged on a side of the substrate 51 away from the light guide plate module 30. The bottom wall 92 is arranged opposite to and apart from the substrate 51, and can cover the accommodating cavity 101. The specific contour of the bottom wall 92 can be a polygon, such as a triangle, a quadrangle, a pentagon, and a hexagon, and it can also be an irregular figure, e.g., the outer contour of the bottom wall 92 is a figure, the contour of which is defined by straight segments and curved segments together. It should be understood that the specific contour of the bottom wall 92 should not be confined to the examples listed in the present specification. To be specific, in the illustrated embodiments, the contour shape of the bottom wall 92 is roughly the same as that of the light guide panel 12, and the outer contour of the bottom wall 92 is roughly a regular hexagon.

The first light blocking strip 941 is roughly in the shape of a long strip, and is arranged between the bottom wall 92 and the substrate 51 and used to prevent multiple second light sources 54 from optical crosstalk. Specifically, the first light blocking strip 941 is fixedly arranged on the bottom wall 92 and protrudes relative to the surface of the bottom wall 92. The number of the first light blocking strip 941 can be the same as that of the second light source 54. For example, there can be multiple first light blocking strips 941, and the multiple first light blocking strips 941 can be arranged in one-to-one correspondence with multiple second light sources 54. The first light blocking strip 941 is located on a side of the corresponding second light source 54 away from the corresponding first light guide side edge 14, so as to prevent the second light source 54 from leaking out of the back surface and ending up with optical crosstalk with other second light sources 54.

Further, the bottom shell 90 can further comprise a second light blocking strip 943, which is roughly in the shape of a long strip, and is arranged between the bottom wall 92 and the substrate 51 and used to prevent multiple third light sources 56 from optical crosstalk. Specifically, the second light blocking strip 943 is fixedly arranged on the bottom wall 92 and protrudes relative to the surface of the bottom wall 92. The number of the second light blocking strip 943 can be the same as that of the third light source 56. For example, there can be multiple second light blocking strips 943, and the multiple second light blocking strips 943 can be arranged in one-to-one correspondence with multiple third light sources 56. The second light blocking strip 943 is located on a side of the corresponding third light source 56 away from the corresponding second light guide side edge 16, so as to prevent the third light source 56 from leaking out of the back surface and ending up with optical crosstalk with other third light sources 56.

In the present embodiment, the bottom shell 90 can further comprise multiple first spacing ribs 961 which are spaced apart from each other and distributed in the extension direction of the first light blocking strip 941. The first spacing rib 961 can be roughly perpendicular to the first light blocking strip 941, and an end portion of the first spacing rib 961 can be connected to the corresponding first light blocking strip 941. Each first spacing rib 961 is located between two adjacent second light-emitting units 541. When each second light emitting unit 541 is controlled to emit light independently, the first spacing rib 961 can avoid optical crosstalk between adjacent second light-emitting units 541, which is conducive to forming light-emitting lines under segmented control, thereby making the lighting effect of the panel light more abundant.

Further, the bottom shell 90 can further comprise multiple second spacing ribs 963 which are spaced apart from each other and distributed in the extension direction of the second light blocking strip 943. The second spacing rib 963 can be roughly perpendicular to the second light blocking strip 943, and an end portion of the second spacing rib 963 can be connected to the corresponding second light blocking strip 943. Each second spacing rib 963 is located between two adjacent third light-emitting units 561. When each third light emitting unit 561 is controlled to emit light independently, the second spacing rib 963 can avoid optical crosstalk between adjacent third light-emitting units 561, which is conducive to forming light-emitting lines under segmented control, thereby making the lighting effect of the panel light more abundant. For example, different parts of the same light-emitting line can have different brightness parameters (such as color or brightness).

In the present embodiment, the bottom shell 90 can further comprise multiple peripheral walls 98. The peripheral walls 98 are arranged on a side of the bottom wall 92 facing toward the substrate 51. The multiple bottom walls 98 are roughly connected to the periphery of the bottom wall 92, and are sequentially connected end to end to form a mounting cavity 980, which is used to accommodate the light-transmitting shell 10. When the light-transmitting shell 10 is embedded into the mounting cavity 980, a peripheral wall 98 is located on the outer side of the second light guide side edge 16, i.e., it is located on a side of the second light guide side edge 16 away from the light guide plate, so that the multiple peripheral walls 98 are arranged outside the multiple second light guide side edge 16 in a surrounding manner, which avoids light from leaking out of the peripheral side of the second light guide side edge 16, and makes the contour of the light-emitting line formed by the second light guide side edge 16 clearer. Further, the peripheral wall 98 can be made from non-transparent materials, or a light shielding film can be arranged on the peripheral wall 98, so as to effectively prevent light from leaking out of the peripheral side.

In the present embodiment, among the bottom wall 92 of the bottom shell 90, the first light blocking strip 941, the first spacing rib 943, the second light blocking strip 961, second spacing rib 963, and the peripheral wall 98, there can exist a relationship of assembly connection, and there can also exist a relationship of integral connection. After the bottom wall 92, the first light blocking strip 941, the first spacing rib 943, the second light blocking strip 961, the second spacing rib 963, and the peripheral wall 98 are respectively prepared and molded, they are connected together by an adhesive or fasteners; alternatively, the bottom wall 92, the first light blocking strip 941, the first spacing rib 943, the second light blocking strip 961, the second spacing rib 963, and the peripheral wall 98 can be prepared by using the same material through the injection molding process or the compression molding process, so as to form the bottom shell 90 in an integral structure.

Figure 16:
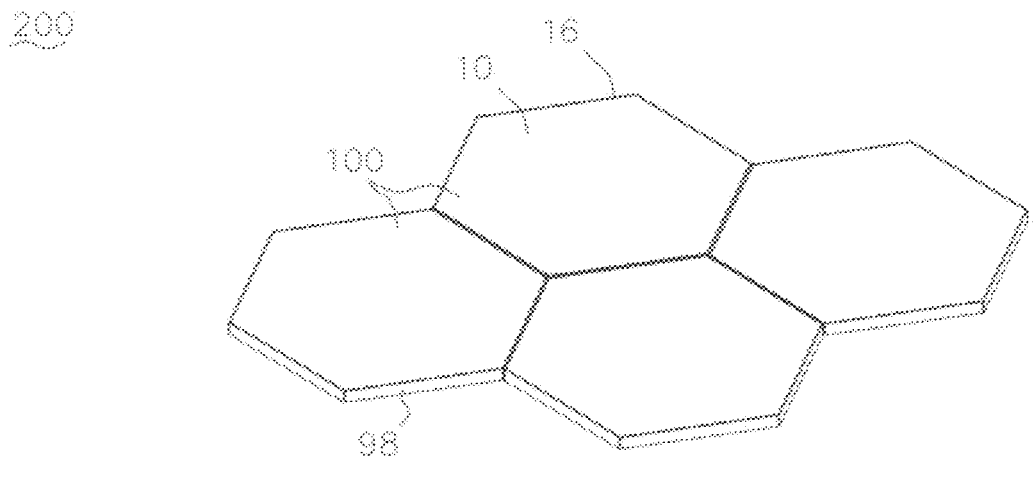
FIG. 16 is a structure diagram of a panel light apparatus provided in an embodiment of the present disclosure.

Referring to FIG. 16, an embodiment of the present disclosure further provides a panel light apparatus 200, which can comprise multiple panel lights 100 provided in any of the above embodiments. The multiple panel lights 100 are adapted to distribution on a predetermined plane, and outer peripheral walls of every two adjacent panel lights 100 can be in contact with each other. For example, when the panel light 100 does not have the bottom shell 90, the outer peripheral walls of the light-transmitting shells 10 of every two adjacent panel lights 100 can be in contact with each other or roughly parallel to each other; alternatively, when the panel light 100 is provided with the bottom shell 90, the peripheral walls 98 of the bottom shells 90 of every two adjacent panel lights 100 can be in contact with each other or roughly parallel to each other. In the present embodiment, the panel light 100 can be provided with a plug-in interface and a corresponding buckle, which can be arranged on the bottom shell 90; each panel light 100 can be fastened to the plug-in interface of an adjacent panel light 100 through the buckle, so as to realize reliable splicing between multiple panel lights 100. By arranging multiple panel lights 100 that can be spliced together, different patterns can be spliced together to present a more three-dimensional visual effect.

The present disclosure provides a panel light and a panel light apparatus equipped with the panel light. The light emitted by the first light source enters the interior of the light guide plate through the light incident surface and exits through the light exit surface and the light guide panel. The light emitted by the second light source exits through the first light guide side edge. By arranging the first light source and the second light source to respectively provide incident light for the light guide plate and the first light guide side, the coordinated lighting effect of the planar light emission and the linear light emission can be achieved, and the light from the first light source and that from the second light source can be independently controlled, which is conducive to achieving multiple lighting effects. Since the second light source alone provides incident light for the first light guide side, the brightness of the first light guide side can be customized according to needs. When the second light source is different from the first light source in color or brightness, the display of the light-emitting line on the first light guide side is more prominent as compared with the light-emitting surface on the light guide panel. By combining the light-emitting line with the light-emitting surfaces that correspond to at least two light guide plates, the three-dimensional lighting effect can be produced, and the lighting effect performance of the panel light can be enriched.

In the present disclosure, e.g., in the specification and claims, certain terms are used to refer to specific assemblies. Persons skilled in the art should understand that hardware manufacturers may use different terms to refer to the same assembly. The specification and claims do not use differences in name as a manner of differentiating the assemblies, but take differences of the assemblies in function as criteria for differentiation. For example, the term "comprise" as mentioned throughout the specification and claims is an open-ended term, and should therefore be interpreted as "include, but are not limited to"; "roughly" means that persons skilled in the art can solve technical problems within a certain error range and achieve technical effects basically.

In the description of the present disclosure, it should be understood that the orientation or positional relationship indicated by the terms such as "up", "down", "front", "back", "left", "right", and "inside" is based on the drawings. The terms simplify the description only for the convenience of describing the present disclosure, and do not indicate or imply that the device or element as referred to must have a specific orientation, or must be constructed and operated in a specific orientation. Therefore, the terms cannot be understood as limitations upon the present disclosure.

In the present disclosure, unless otherwise specified or limited, the terms such as "mount", "link", "connect", and "fix" should be interpreted broadly. For example, it can be fixed connection, detachable connection, or integrated connection; it can be mechanical connection or electrical connection; it can be direct connection, indirect connection through an intermediate medium, internal connection between two elements, or merely surface contact. For persons skilled in the art, the specific meanings of the above terms in the present disclosure can be understood according to the specific situation.

In the description of the present specification, the reference to the terms such as "one embodiment", "some embodiments", "example", "specific example", or "some examples" means that the specific features, structures, materials, or characteristics described in combination with the embodiment or example are included in at least one embodiment or example of the present disclosure. In the present specification, the schematic expressions of the above terms are not necessarily directed to the same embodiment or example. Moreover, the specific features, structures, materials, or characteristics as described can be combined in any one or more embodiments or examples in an appropriate manner. In addition, persons skilled in the art can combine different embodiments or examples described in the present specification, as well as the features in different embodiments or examples, without conflicting with each other.

In addition, the terms "first" and "second" are only used for descriptive purposes, and it cannot be understood in such a way that they indicate or imply the relative importance, or implicitly point out the number of the technical features as referred to. Therefore, the features that are limited by "first"

and "second" can explicitly or implicitly show that the number of the features as included is at least one. In the description of the present disclosure, "multiple" means at least two, such as two and three, unless otherwise specified.

Finally, it should be noted that the above embodiments are only used to account for the technical solutions of the present disclosure, rather than limit them. Although the present disclosure has been elaborated with reference to the embodiments, persons skilled in the art should understand that they can still modify the technical solutions recorded in the embodiments, or make equivalent substitutions for some technical features. Moreover, these modifications or substitutions do not deviate the essence of the corresponding technical solutions from the spirit and scope of the technical solutions in the embodiments of the present disclosure.

What is claimed is:

1. A panel light, comprising:
a light guide plate module, which comprises at least two light guide plates spaced apart from each other, wherein a light guide gap is formed between two adjacent light guide plates, and the light guide plates each comprise a light incident surface and a light exit surface;
a light-transmitting shell, which is provided with an accommodating cavity, wherein the light guide plate module is arranged in the accommodating cavity, the light-transmitting shell comprises a light guide panel and at least one first light guide side edge, the light guide panel covers the light exit surface of the light guide plate module, and the first light guide side edge is arranged on a side of the light guide panel facing toward the accommodating cavity and is located in the light guide gap; and
a light source module, which comprises a first light source and a second light source, wherein the first light source is arranged opposite to the light incident surface of the light guide plates, so that light emitted by the first light source enters interior of the light guide plates through the light incident surface and exits through the light exit surface and the light guide panel, and light from the second light source exits through the first light guide side edge.

2. The panel light according to claim 1, wherein the light-transmitting shell further comprises multiple second light guide side edges, the multiple second light guide side edges are all arranged on the side of the light guide panel facing toward the accommodating cavity, and the multiple second light guide side edges are sequentially connected end to end to jointly define the accommodating cavity; the light source module further comprises a third light source that is arranged in the accommodating cavity, and light from the third light source exits through the second light guide side edges.

3. The panel light according to claim 2, wherein the light guide plates each further comprise a back surface that faces away from the light exit surface, the light incident surface is connected between the back surface and the light exit surface, and arranged opposite to and apart from a corresponding second light guide side edge to form a predetermined gap, and the first light source is arranged in the predetermined gap.

4. The panel light according to claim 3, wherein the light guide panel covers the predetermined gap, and the first light source and the light guide panel are arranged apart from each other; the panel light further comprises a light shielding layer, which is arranged between the first light source and the light guide panel.

5. The panel light according to claim 3, wherein the light guide plates each further comprise multiple side surfaces, which are connected between the back surface and the light exit surface, and the light incident surface and the multiple side surfaces jointly form an outer wall of the light guide plates; a side surface of one light guide plate is arranged opposite to and apart from a side surface of an adjacent light guide plate; the light guide plate module further comprises a reflective layer, which is arranged on at least one of the back surface and the side surfaces, and a reflective surface of the reflective layer faces toward the interior of the light guide plates.

6. The panel light according to claim 2, wherein the number of the first light guide side edges is N, and N is a positive integer greater than or equal to 2; the number of the light guide plates is N, N light guide plates are sequentially distributed around a predetermined center, and each of the first light guide side edges is arranged between two corresponding adjacent light guide plates.

7. The panel light according to claim 6, wherein the number of the second light guide side edges is M, M is a positive integer greater than or equal to 2, and M is an integer multiple of N;

M/N second light guide side edges are sequentially connected between two adjacent first light guide side edges, so that M/N second light guide side edges and two first light guide side edges jointly surround a corresponding light guide plate.

8. The panel light according to claim 6, wherein the number of the first light guide side edges is three, the number of the second light guide side edges is six, and two second light guide side edges are sequentially connected between every two adjacent first light guide side edges, so that the two second light guide side edges and two first light guide side edges jointly surround a corresponding light guide plate.

9. The panel light according to claim 1, wherein the first light guide side edge is arranged in the accommodating cavity and divides the accommodating cavity into at least two accommodating chambers, and each of the light guide plates is located in a corresponding accommodating chamber.

10. The panel light according to claim 1, wherein the panel light further comprises a diffusion plate module, which is arranged between the light guide plate module and the light guide panel.

11. The panel light according to claim 10, wherein the diffusion plate module comprises at least two diffusion plates spaced apart from each other, a through groove is formed between two adjacent diffusion plates, the through groove is opposite to and in communication with the light guide gap, and the first light guide side edge is threaded through the through groove and the light guide gap.

12. The panel light according to claim 1, wherein the light source module further comprises a substrate, the substrate is arranged on a side of the light guide plate module away from the light guide panel, the first light source and the second light source are both arranged on the substrate, and the light incident surface is located between the light exit surface and the substrate; the first light source comprises multiple first light-emitting units which are spaced apart from each other and sequentially distributed in an extension direction of the light incident surface.

13. The panel light according to claim 12, wherein the second light source is fixed on a side of the substrate away from the light guide plate module, the substrate is provided with a clearance groove, which is opposite to and in communication with the light guide gap, the first light guide side edge is threaded through the clearance groove and exposed on the side of the substrate away from the light guide plate module, so that the light from the second light source can be incident on the first light guide side edge.

14. The panel light according to claim 12, wherein the first light guide side edge is flush with a side surface of the substrate facing away from the light guide plate module.

15. The panel light according to claim 12, wherein the first light guide side edge protrudes relative to the side of the substrate away from the light guide plate module, so as to be arranged opposite to and apart from the second light source, and a reflective element is arranged on a side of the first light guide side edge away from the second light source.

16. The panel light according to claim 12, wherein the panel light further comprises a bottom shell, and the bottom shell is arranged on the side of the substrate away from the light guide plate module; the bottom shell comprises a bottom wall and a first light blocking strip, the bottom wall and the substrate are arranged opposite to and apart from each other, and the first light blocking strip is arranged between the bottom wall and the substrate, and located on a side of the second light source away from a corresponding first light guide side edge.

17. The panel light according to claim 16, wherein the second light source comprises multiple second light-emitting units which are spaced apart from each other and sequentially distributed in the extension direction of the first light guide side edge; the bottom shell further comprises multiple first spacing ribs which are sequentially arranged apart from each other, each first spacing rib is located between two adjacent second light-emitting units.

18. The panel light according to claim 16, wherein the bottom shell further comprises multiple peripheral walls, the peripheral walls are connected to a side of the bottom wall facing toward the substrate, the multiple peripheral walls are sequentially connected end to end to jointly form a mounting cavity, and the light-transmitting shell is embedded in the mounting cavity.

19. The panel light according to claim 18, wherein the light-transmitting shell further comprises multiple second light guide side edges, the multiple second light guide side edges are all arranged on the side of the light guide panel facing toward the accommodating cavity, and the multiple second light guide side edges are sequentially connected end to end to jointly define the accommodating cavity; the light source module further comprises a third light source that is arranged in the accommodating cavity, and the light from the third light source exits through the second light guide side edges; the multiple peripheral walls are arranged outside the multiple second light guide sides in a surrounding manner.

20. A panel light apparatus comprising multiple panel lights, wherein the multiple panel lights are adapted to distribution on a predetermined plane, and outer peripheral walls of two adjacent panel lights are in contact with each other;

wherein each panel light comprises:
   a light guide plate module, which comprises at least two light guide plates spaced apart from each other, wherein a light guide gap is formed between two adjacent light guide plates, and the light guide plates each comprise a light incident surface and a light exit surface;
   a light-transmitting shell, which is provided with an accommodating cavity, wherein the light guide plate module is arranged in the accommodating cavity, the light-transmitting shell comprises a light guide panel and at least one first light guide side edge, the light guide panel covers the light exit surface of the light
guide plate module, and the first light guide side edge
is arranged on a side of the light guide panel facing
toward the accommodating cavity and is located in the
light guide gap; and
a light source module, which comprises a first light source
and a second light source, wherein the first light source
is arranged opposite to the light incident surface of the
light guide plates, so that light emitted by the first light
source enters interior of the light guide plates through
the light incident surface and exits through the light exit
surface and the light guide panel, and light from the
second light source exits through the first light guide
side edge.

\* \* \* \* \*

20